United States Patent
Roos et al.

(10) Patent No.: US 8,412,009 B2
(45) Date of Patent: Apr. 2, 2013

(54) OPTICAL FIBER CONTACT

(76) Inventors: Sven-Olov Roos, Floda (SE); Ola Blomster, Mölndal (SE); Thomas Uhrwing, Göteborg (SE)

(*) Notice: Subject to any disclaimer, the term of this patent is extended or adjusted under 35 U.S.C. 154(b) by 404 days.

(21) Appl. No.: 12/679,589

(22) PCT Filed: Sep. 19, 2008

(86) PCT No.: PCT/SE2008/000526
§ 371 (c)(1),
(2), (4) Date: Mar. 23, 2010

(87) PCT Pub. No.: WO2009/041874
PCT Pub. Date: Apr. 2, 2009

(65) Prior Publication Data
US 2010/0195957 A1    Aug. 5, 2010

(30) Foreign Application Priority Data
Sep. 25, 2007   (SE) ...................... 0702125

(51) Int. Cl.
G02B 6/42    (2006.01)
G02B 6/36    (2006.01)
G02B 6/02    (2006.01)
G02B 6/00    (2006.01)

(52) U.S. Cl. .............. 385/29; 385/77; 385/78; 385/126; 385/128; 385/134

(58) Field of Classification Search .............. 385/26–29, 385/33, 70, 76–79, 100, 126–128, 134, 34
See application file for complete search history.

(56) References Cited

U.S. PATENT DOCUMENTS

| 6,167,177 A * | 12/2000 | Sandstrom et al. ........... 385/100 |
| 2003/0103724 A1 * | 6/2003 | Duck et al. ...................... 385/33 |
| 2003/0138202 A1 * | 7/2003 | Zhou et al. ...................... 385/33 |
| 2007/0172174 A1 | 7/2007 | Scerbak et al. |
| 2009/0310917 A1 | 12/2009 | Roos et al. |

FOREIGN PATENT DOCUMENTS

| DE | 4305313 C1 | 3/1994 |
| EP | 0619508 A1 | 10/1994 |
| WO | WO-9801784 A1 | 1/1998 |

OTHER PUBLICATIONS

PT/ISA/210—International Search Report—Jan. 12, 2009.
PCT/ISA/237—Written Opinion of the International Searching Authority—Jan. 12, 2009.

* cited by examiner

*Primary Examiner* — Brian Healy
*Assistant Examiner* — Hung Lam
(74) *Attorney, Agent, or Firm* — Venable LLP; Eric J. Franklin

(57) ABSTRACT

An optical fiber contact for transmitting moderate-magnitude optical power. The fiber contact includes an optical fiber having an inner core and a surrounding cladding for transmitting the radiation in the core. Additional surrounding layers including so-called buffer and jackets mechanically stabilize the optical fiber. The forward part of the optical fiber contact is surrounded by a transparent tubular member. The tubular member extends a certain length along the outer cylindrical surface of the cladding. There is no heating by power loss radiation, as the power loss radiation is leaving the contact as optical radiation. To disperse radiation propagating within the cladding, the cladding includes a roughening or additional layers of a transparent material. In case of additional layers of transparent material then the outermost layer should be roughened.

12 Claims, 2 Drawing Sheets

OPTICAL FIBER CONTACT

CROSS-REFERENCE TO RELATED APPLICATIONS

This application claims priority to Swedish patent application 0702125-6 filed 25 Sep. 2007 and is the national phase under 35 U.S.C. §371 of PCT/SE2008/000526 filed 19 Sep. 2008.

FIELD OF THE INVENTION

The present invention relates to an optical fiber contact for transmitting moderate-magnitude optical power, specifically power in the range of 50-500 W, comprising an optical fiber having an inner core and a surrounding cladding for transmitting the radiation within the core, as well as additional surrounding layers or protecting jackets in order to mechanically stabilise the optical fiber.

BACKGROUND OF THE INVENTION

In order to avoid damage of the optical fiber contact in case of incident radiation outside the core of the fiber, or radiation reflected back to the fiber contacts, specific methods have been developed to take care of such power loss. When transmitting low optical power a more conventional type of fiber contact might be used, but in case of high optical power some kind of cooling is required, for instance means for absorbing incident power loss radiation at least partially in a flowing coolant.

Optical fiber cables for transmitting optical power in the range of some mW up to several kW are frequently used in industrial applications. For such applications specific type of contacts have been developed to transmit the radiation between different units. For low optical power it is previously known a contact type called SMA, based on a ferrule which is centering the fiber. The ferrule can be made of a metal, or a ceramic material in order to sustain more high optical power. Such a contact is small and has a low manufacturing cost, but has a limited use because of low cooling capacity so that the contact might be damaged under heavy heating. For that reason there are other types of fiber contacts for high optical power on the market which are based on the fact that a certain length of the fiber is detached. However, only a limited increase of capacity can be achieved by this type of contact design. The contact might transmit high optical power, but if the radiation for some reason comes outside the core of the fiber the contact might be destroyed. For that reason this type of contact should be used only for optical power up to some tenths of W.

The main reason for a damage in the optical system is the heating. Normally, an optical fiber has an inner core made of glass and one or more surrounding layers having a refractive index which exceeds the refractive index of the core in order to "lock" the radiation into the core without any power loss. Such a surrounding layer or layers are called the cladding of the fiber. Outside the cladding there are also one or more protecting layers to stabilise the fiber mechanically. These layers are called buffers or jackets, and they are optimized for a high mechanical capacity but they do not have the necessary optical capacity to take care of high optical power. In case of radiation entering into the cladding such radiation is propagating through the cladding up to the area in which the surrounding protecting layers are connected to the cladding. This is a critical region of the fiber, and therefore a damage might be expected here.

Another critical region of the fiber, which is exposed to damages, is the part of the fiber which is in a mechanical contact with a supporting element. Radiation transmitted in the cladding might leak out in such contacting points and cause a damage of the fiber. As soon as the fiber is built into a contact, the fiber must be maintained and centered in a correct position in the contact body and therefore some mechanical component is required to hold the fiber and which then also comes into a mechanical contact with the fiber.

Different methods to take care of the unwanted power radiation and protect the fiber components against damages are already known. In fiber contacts for high optical power unwanted radiation can be removed from the cladding by means of so-called mode stripping, see for instance EP 0619508. In this case the cladding is provided with an additional layer which can be roughened for diverging unwanted radiation, which is entered into the cladding, into the surroundings. By making the fiber contact big enough, and thereby the outer surface exposed to the surroundings big enough, unwanted heating can be reduced, see for instance DE 4305313. There are also other types of cooling methods, specifically by means of inner water cooling in the contact so that unwanted power radiation is spread away, see EP 0910810.

In SE 0600263-8 it is described another example of an optical fiber contact for high optical power. In this case the end surface of the fiber is in optical contact with a body of a transparent material, for instance a rod or any other type of a solid body made of quartz, which body in connection with the optical fiber end has a surface area exceeding the contact surface area of the fiber end and has a conical design. By such a design of the surface of the transparent body a more efficient flowing geometry is provided around the fiber end. Furthermore, such a surface provides an increased area for incident power loss radiation as well as deflection of such incident radiation towards the optical axis of the fiber contact.

The cooling methods which have been described now can be used also for very high optical power. However, such optical fiber contacts are complicated, expensive and voluminous. There is a need for an optical fiber contact to be used for moderate-magnitude power radiation, typically 50-500 W, and which are not too complicated and voluminous.

SUMMARY OF THE INVENTION

According to the invention the forward part of the optical fiber contact is transparent so that power loss radiation is leaving the fiber contact in the form of optical radiation without any heating of the contact.

According to a preferred embodiment of the invention the forward part of the optical fiber contact is surrounded by a transparent tubular member, preferably made of a material similar to the cladding material. The tubular member is extending a certain length along the outer cylindrical surface of the cladding, surrounding and connected to the cladding along this length distance.

According to a further preferred embodiment the tubular member and the fiber are fused together at the front end to provide a single mechanical structure.

BRIEF DESCRIPTION OF THE DRAWINGS

In the following the invention will be described more in detail with reference to the accompanying drawings, in which.

DETAILED DESCRIPTION OF EMBODIMENTS OF THE INVENTION

Figure 1:
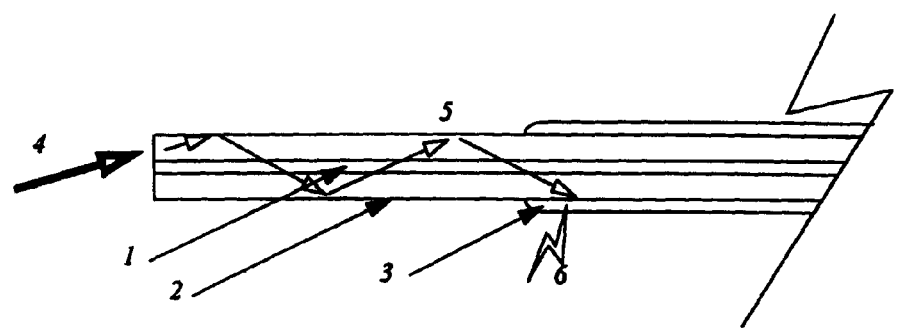
FIG. 1 illustrates what happens in a typical optical fiber contact when over-heated, FIG. 2 schematically illustrates an optical fiber contact according to the invention in which the forward part of the optical fiber contact is surrounded by a transparent tubular member.

In FIG. 1 it is illustrated the general design of a conventional optical fiber having areas which might be over-heated and damaged when the fiber is exposed to incident power loss radiation. The optical fiber comprises an inner core 1, for instance made of quartz glass, for transmitting radiation, and a surrounding cladding 2, for example made of glass or some polymer, and having a refractive index exceeding the refractive index of the core to optically "lock" the radiation into the core without any power loss. Outside the cladding there are one or more layers 3 of protecting jackets or buffers to mechanically stabilise the fiber. These layers are optimized for mechanical capacity and does not necessarily have the required optical capacity to take care of high optical power. As the fiber is built into a contact member the fiber also has to be fixed positioned by means of any mechanical component. These outer mechanical components have not been illustrated in FIG. 1.

In case of an incident radiation 4 into the cladding 2 the radiation is propagating through the cladding, indicated by the arrow 5 in the figure, to the region in which the surrounding layers 3 are connected to the cladding, indicated by numeral 6 in the figure. This is a critical area for the fiber, an area in which it is often an over-heating which might lead to a damage of the fiber. Other critical areas on the fiber are those areas in which the mechanical elements are supporting the fiber. In these areas radiation in the cladding might leak out and cause damages. The fiber has to be supported in these areas to be centered in the fiber contact.

Figure 2:
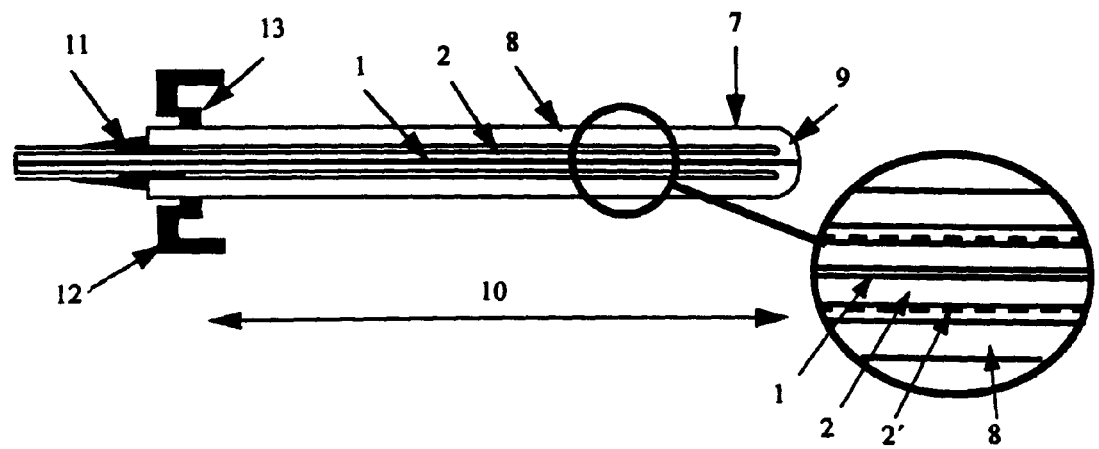

In FIG. 2 it is illustrated an optical fiber contact which according to the invention is provided with a transparent forward part 7. This means that there is no heating by power loss radiation, as the power loss radiation is leaving the contact as optical radiation. The fiber with its core 1 and cladding 2 is inserted into a transparent tubular member 8 preferably made of a material similar to the cladding, i.e. made of glass or some polymer, having the same refractive index, or slightly higher than the cladding. The transparent tubular member 8 is surrounding the cladding along a certain distance 10, so that the inner cylindrical surface of the tubular member is adapted to the outer cylindrical surface of the cladding. In the front end the tubular member and the fiber are preferably fused together to form a mechanical structure 9.

On the cladding 2 it is also provided a mode stripper, schematically illustrated by the dotted line 2' in FIG. 2, either by means of a roughening of the cladding surface to a matt-finish or by means of a further layer having a refractive index corresponding to the refractive index of the cladding, or slightly higher. If radiation for some reason goes into the cladding, such radiation is gradually leaving the cladding along a certain distance 10. The distance 10 should be long enough so that the remaining radiation in the cladding does not harm the surrounding layer or details. At least one of the cylindrical surfaces of the outer tubular member, preferably its outer cylindrical surface, could be roughened like the cladding or matt-finished, so that the radiation is reflected away from this sleeve prior to the termination of the contact. Even in this case the distance 10 should be selected long enough so that the radiation power is reduced to such a level that it does not harm components and glue joints at the rear part of the contact. This means that glue joints 11 and non-transparent mechanical components such as locking nuts 12 and rings 13 could be used in these rear regions, as the radiation power has been reduced to such an extent that it does not harm. The length of the transparent tube is typically 30-100 mm, while its outer diameter is typically 1-5 mm.

The end surface of the fiber is centered against the outer diameter of the transparent tubular member 8 in the forward part 7 of the fiber contact. If necessary grinding of the surface might be carried out for the centering.

Figure 3:
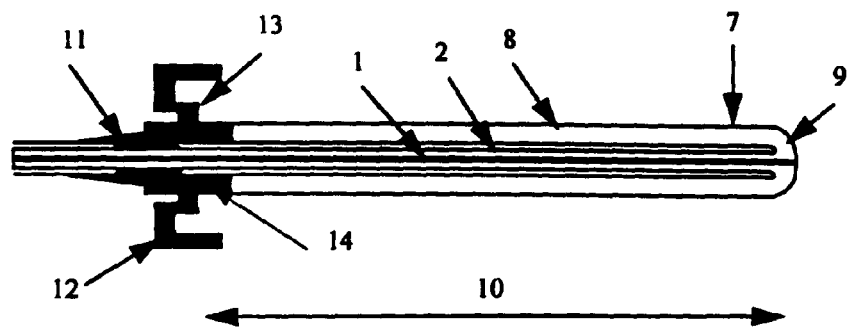
FIG. 3 illustrates an alternative embodiment with a non-transparent, but light-scattering member arranged in the rear region of the contact.

In FIG. 3 it is illustrated another example of the fiber contact. According to the invention, also in this case the optical fiber with its core 1 and cladding 2 is inserted into a transparent tubular member 8, preferably made of a material similar to the cladding material, i.e. glass or some polymer. At the forward part the sleeve and the fiber are fused together to form a mechanical structure 9. A non-transparent, non-absorbing but light-scattering sleeve member 14 is provided at the rear part of the fiber contact as a further protection of the rear glue joint 11. This means that the length 10 can be reduced. The non-transparent, non-absorbing but light-scattering sleeve member 14 could be made of for instance aluminium oxide ceramics ($Al_2O_3$) or the like, and it could have the same outer dimensions as the transparent tubular member 8 so that it also is surrounding the cladding and is forming an extension of the transparent tube. Also in this case non-transparent mechanical components such as locking nuts 12 and rings 13 could be applied in the rear regions of the contact.

Figure 4:
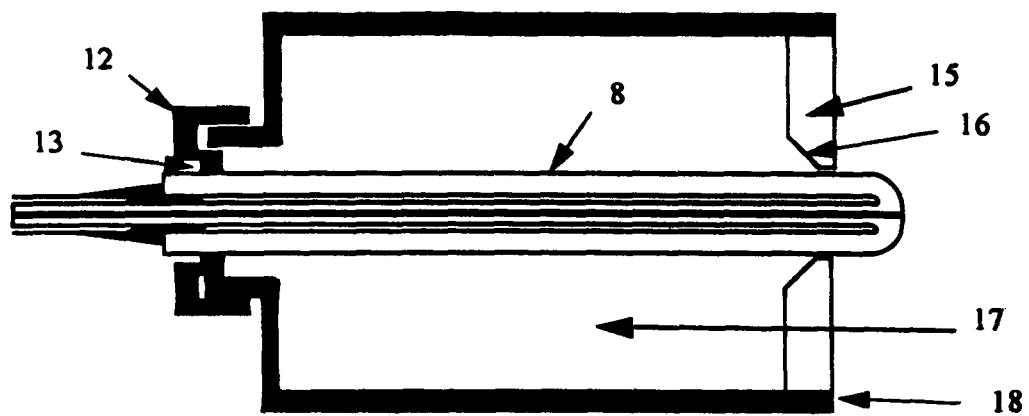
FIG. 4 illustrates a first application example of the fiber contact.
Figure 5:
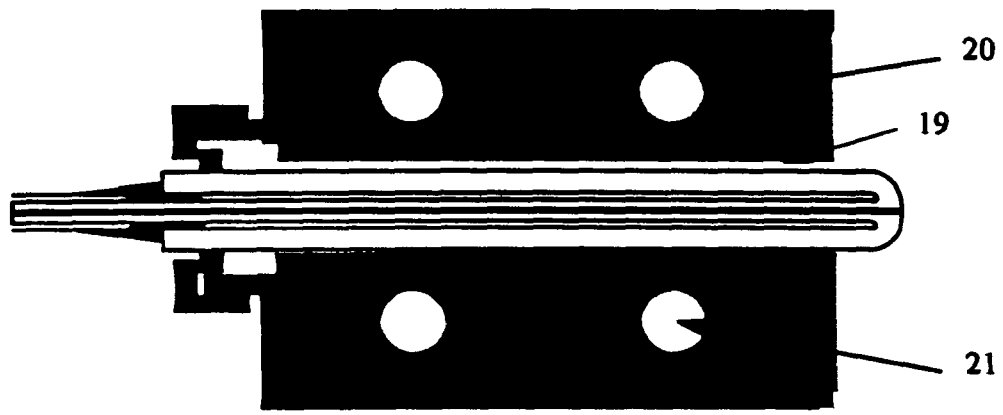
FIG. 5 illustrates a second application example of the fiber contact.

In FIGS. 4 and 5 it is illustrated some proposed applications of the fiber contact. In the application of FIG. 4 the forward part of the fiber contact is hold by means of a supporting element 15 having a conical aperture 16. If necessary this supporting element 15 can be made of a non-absorbing material. The mechanical design of the forward and rear parts of the fiber contact provides for a cavity 17 formed between the outer transparent tubular member 8 of the fiber contact, a cylindrical housing 18, the front supporting element 15 and rear supporting rings 12, 13. By means of this cavity 17 the power loss is distributed over an increased surface, which means that the risk for over-heating and damages is minimized.

In FIG. 5 it is illustrated another application in which the fiber contact is arranged in a substantially cylindrical guiding member 19 in a surrounding body 20 made of a heat-conducting material. If necessary this body might be provided with channels 21 for water cooling.

Figure 6:
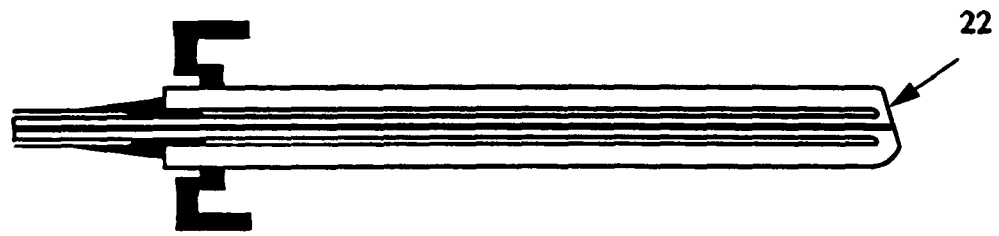
FIG. 6 illustrates a device for minimizing back-reflections.

If the fiber contact is used together with equipments susceptible to optical back reflections the front end 22 of the fiber contact might be inclined by grinding and polished, see FIG. 6. In case of back-reflections, the radiation is deviated by means of the inclined and polished end surface of the fiber contact.

The invention is not limited to the examples that have been illustrated here but can be varied within the scope of the following claims.

The invention claimed is:

1. An optical fiber contact for transmitting moderate-magnitude optical power, the optical fiber contact comprising:
   an optical fiber comprising
      an inner core,
      a cladding surrounding the inner core for transmitting the radiation within the core, the cladding having an outer cylindrical surface, and
      additional layers surrounding the cladding to mechanically stabilize the optical fiber,
   a transparent tubular member surrounding a forward part of the optical fiber contact, wherein the transparent tubular member extends a portion of a length along the outer cylindrical surface of the cladding, and
   a mode stripper applied to the cladding to disperse radiation propagating within the cladding,
   wherein the transparent tubular member and the optical fiber are fused together at a front end of the forward part of the contact forming a mechanical structure, and wherein at least a portion of the cylindrical surfaces of the transparent tubular member is roughened.

2. The optical fiber contact according to claim 1, wherein the mode stripper comprises a roughening of the cladding.

3. The optical fiber contact according to claim 1, wherein the mode stripper comprises an additional layer of a transparent material having a roughening and applied to the cladding.

4. The optical fiber contact according to claim 1, wherein the transparent tubular member surrounds the cladding along said length.

5. The optical fiber contact according to claim 1, wherein the transparent tubular member has an outer diameter of 1-5 mm and a length of 30-100 mm.

6. The optical fiber contact according to claim 1, further comprising:
   a non-transparent, non-absorbing but light-scattering sleeve member applied to a rear region of the contact, surrounding the cladding and forming an extension of said transparent tubular member.

7. The optical fiber contact according to claim 6, wherein said non-transparent, non-absorbing but light-scattering sleeve member comprises aluminum oxide ceramics and has substantially a same outer diameter as the transparent tubular member.

8. The optical fiber contact according to claim 1, further comprising:
   a cylindrical housing,
   a rear ring-shaped supporting element,
   a front supporting element configured to hold the forward part of the fiber contact, wherein the front supporting element comprises a conical aperture, and wherein the forward part and a rear part of the fiber contact provide a cavity formed between the outer transparent tubular member of the fiber contact, the cylindrical housing, the front supporting element and the rear ring-shaped supporting element.

9. The optical fiber contact according to claim 8, wherein the front supporting element comprises a non-absorbing material.

10. The optical fiber contact according to claim 1, wherein the front end of the fiber contact has an inclined grinded and polished surface to deviate back-reflected radiation.

11. The optical fiber contact according to claim 1, wherein the optical fiber contact is for transmitting moderate-magnitude optical power, in the range of 50-500 W.

12. The optical fiber contact according to claim 1, wherein the transparent tubular member comprises a material similar to the material of the cladding.

* * * * *